(12) United States Patent
Kennedy (10) Patent No.: US 7,409,948 B2
(45) Date of Patent: Aug. 12, 2008

(54) ENGINE EFFICIENCY REGULATOR

(76) Inventor: Roger Kennedy, 152 Bury New Road, Whitefield, Manchester (GB) M45 6AD ( * ) Notice: Subject to any disclaimer, the term of this patent is extended or adjusted under 35 U.S.C. 154(b) by 0 days.

(21) Appl. No.: 10/583,921

(22) PCT Filed: Dec. 23, 2004

(86) PCT No.: PCT/GB2004/005399

§ 371 (c)(1),
(2), (4) Date: Jun. 20, 2006

(87) PCT Pub. No.: WO2005/061879

PCT Pub. Date: Jul. 7, 2005

(65) Prior Publication Data

US 2007/0144504 A1  Jun. 28, 2007

(30) Foreign Application Priority Data

Dec. 24, 2003 (GB) ............................. 0329935.1
Jan. 19, 2004 (GB) ............................. 0401069.0

(51) Int. Cl.
*F02M 29/02* (2006.01)
(52) U.S. Cl. ........................ 123/590; 123/592
(58) Field of Classification Search .............. 123/549, 123/590–593
See application file for complete search history.

(56) References Cited

U.S. PATENT DOCUMENTS

| 1,614,322 | A | 1/1927 | Smith |
| 3,447,514 | A | 6/1969 | Trafford |
| 4,059,082 | A | 11/1977 | McCauley |
| 4,361,128 | A | 11/1982 | Goldman et al. |
| 5,180,406 | A | 1/1993 | Shih |
| 5,580,368 | A | 12/1996 | Lu |
| 7,171,959 | B2 * | 2/2007 | Kennedy .................... 123/592 |

FOREIGN PATENT DOCUMENTS

| GB | 982461 | 2/1965 |
| GB | 1 211 855 | 11/1970 |
| GB | 2 067 658 | 7/1981 |
| WO | WO 02/086304 | 10/2002 |

* cited by examiner

*Primary Examiner*—Stephen K. Cronin
*Assistant Examiner*—Hyder Ali
(74) *Attorney, Agent, or Firm*—Gerald E. Hespos; Anthony J. Casella (57) ABSTRACT

A regulator is provided for increasing the efficiency of an engine. The regulator is locatable in or adjacent to an engine manifold and has a propeller (18) connected to a power supply (58) for driving the propeller. The propeller is mounted (18) in the manifold. The propeller has a longitudinal pin (16) defining a rotation axis and at least one blade attached to the pin by an elongated blade root that substantially follows the longitudinal axis of the pin.

13 Claims, 6 Drawing Sheets

ENGINE EFFICIENCY REGULATOR

The present invention relates to an engine efficiency regulator, in particular for increasing the efficiency of an internal combustion engine, or for decreasing emissions from an engine.

Internal combustion engines rely upon a fuel and air mixture which is supplied to the combustion chamber prior to combustion, which is initiated by a sparking device. Ideally, the fuel and air mixture should be supplied to the engine in a homogeneous mixture of fine fuel particles in air in order to utilise the fuel efficiently. Despite the recent developments in fuel injection technology, there are still problems associated with obtaining a homogeneous mixture of fuel and air, resulting in excessive smoke and unburned fuel being expelled by the exhaust or deposited in the engine. This in itself brings a number of problems as such smoking and burnt fuel can greatly shorten the life of a catalytic converter (should such be fitted to an exhaust system). In addition, deposits and residues being left in or around the inlet manifold of an engine can reduce the efficiency of engine.

There are also problems associated with "cold engine starts" wherein the fuel to air ratio is greatly increased in order to ensure that the engine will start from cold. This further exaggerates the problem regarding un-burnt fuel and excessive smoke. Such smoking and un-burnt fuel also contribute greatly to environmental problems and therefore it would be advantageous to help alleviate problems associated with inefficient engines. Of course, by providing a means by which an engine can use fuel more efficiently will also reduce fuel consumption and increase horse power which is also greatly advantageous.

Problems are also associated with outlet manifolds which expel most material from the engine to the exhaust, and ultimately to the environment. Should an outlet manifold or exhaust system be inefficient in allowing exhaust gases to flow freely, the engine will not perform at its ultimate efficiency, as pressure built up in the outlet manifold will ultimately slow down the pistons and prevent combustion occurring at an optimum rate. Furthermore, excess unburnt fuel increases hydrocarbon (HC) emissions and the smoke from unburnt residues contribute greatly to the emission of particulate matter. It would therefore be greatly advantageous to reduce such emissions in order that engines can run more efficiently, and which has reduced emissions.

A number of devices have been proposed in order to alleviate the problems associated with inefficient mixing of the air and fuel prior to combustion.

U.S. Pat. No. 1,509,694 discloses an auxiliary fuel mixer for an internal combustion engine having a carburetor and an intake manifold which comprises a rotary fan member extending across the inlet manifold. Whilst this device may increase mixing of fuel and air, it is purely dependent upon the air intake and fuel vapour for its rotation and therefore mixing and thus its rotation will be dependent upon the "suck" of the engine cylinders. Indeed such a device may result in less fuel and air entering the combustion chamber.

U.S. Pat. No. 4,106,454 discloses an apparatus for increasing the efficiency of combustion in an internal combustion engine by having at least one screen inserted between the fuel atomizing means and the intake for contacting the fuel which has been atomized, the screen being heated sufficiently to vaporize atomized fuel coming into contact with it. Whilst this device may indeed assist vaporization of the fuel and air mixture the screen and heating elements would slow down the path of the air and fuel mixture and in doing so can result in the fuel recondensing before reaching the combustion chamber. U.S. Pat. No. 4,342,303 & EP 0854283 disclose similar apparatus which again would result in a similar problem with recondensing of fuel prior to entry of the mixture into the combustion chamber.

It is therefore an object of the present invention to alleviate one or more of the problems associated with the prior art devices and to provide a regulator for ensuring that the air and atomized fuel is mixed efficiently and remains so, prior to entry into the combustion chambers. It is also an object of the present invention to provide a regulator for increasing the efficiency of an engine with regard to the intake manifold and/or the outlet manifold.

Accordingly, the present invention provides a regulator for increasing the efficiency of an engine, the regulator being locatable in or adjacent to an engine manifold and comprising a propeller connected to a power supply for driving the propeller, and a means for mounting the propeller in the manifold, the propeller having a longitudinal pin defining a rotation axis and at least one blade attached to the pin by means of an elongated blade root which substantially follows the longitudinal axis of the pin. The present invention therefore provides a regulator for increasing the efficiency of an engine by increasing the homogeneous mixture of fuel and/or air prior in an inlet manifold and/or additionally allows for increased efficiency for the removal of waste products from the outlet manifold of an engine.

The blade root will preferably follow the longitudinal axis of the pin in an at least partial helical manner. The length of the blade root may be greater than the distance between the blade tip to the pin. Furthermore, the length of the blade root is substantially equal to the blade length. The term "blade root" should be taken to mean the area of the blade where the blade attaches to the propeller boss/pin. Also, the term "blade tip" should be taken to mean the maximum reach of the blade from the centre of the pin and the tip is often used to separates the leading edge from the trailing edge of a propeller blade.

The regulator may further comprises a perforated element capable of allowing the passage of fluid material therethrough, and a means for mounting the perforated element in the manifold. The blade may be substantially curved in shape and may furthermore have a substantially smoothly curving blade edge. Preferably, the blade has a shape substantially of a semi-circle, an ellipse, a part ellipse, a teardrop, a half-teardrop, a bell curve, a half-bell curve, a rectangle, a square, a triangle or derivatives thereof. The blade may be wider towards one end of the blade root. Furthermore, the propeller will preferably be effective to pull fluid material from a region upstream of the propeller to a region downstream of the propeller and additionally, to cause turbulent fluid flow in the region downstrem thereof. Each blade may be attached to the pin at different positions so that the blades may have a "staggered" appearance. Each blade may also be of a different or similar size and indeed, each blade may have a different shape.

Thus, in one of its aspects the invention may provide an internal combustion engine regulator for increasing the efficiency of an engine, the regulator located in or near to a manifold and comprising at least one perforated element capable of allowing the passage of fluid material therethrough, one or more propellers connected to a power supply for diving the propeller, and a means for mounting the at least one perforated element, and the propeller in the manifold, the propeller having a plurality of blades in the shape substantially of a semi-circle, a tear drop, half a tear drop, a bell curve or a half bell curve or derivatives thereof.

Preferably, there are at least two perforated elements. A number of configurations of the perforated elements can be utilized and this may be dependent upon the size and curvature of a specific manifold. Preferably, a first perforated element is disposed in front (i.e. upstream) of the propeller and a second perforated element is disposed behind (i.e. downstream) the propeller. In order to either assist in the vaporization of the atomized fuel (in the case of a regulator placed in the inlet manifold) or to burn unused gases (when the regulator is used in an outlet manifold), at least one perforated element and/or the propeller may be heated by a heating means. The means for heating may be connected directly to the perforated element or propeller. Alternatively, the means for heating may be connected indirectly to the perforated element or propeller. The means for heating may comprise an electrical power supply from the battery or alternator. Alternatively, the means for heating may comprise thermal conduction from a heating element running from the engine block and this may either be by means of a heat exchanger or by utilising thermal energy contained within the coolant running away from the engine. The means for heating may be applied directly to the perforated element in order to heat the element, but the perforated element may also be used as a heating element itself and it will be apparent to the skilled addressee that should the perforated element be used as a heating element itself that it may be manufactured from a material which emits heat when an electric current is applied to it. The propeller may be heated by a number of means such as containing heating elements on one or more of its blades, but also the propeller may be heated via heat conduction applied to the shaft around which the propeller rotates. The regulator may also be heated by means of an electrical coil exposed externally or internally to the regulator and preferably such a coil could extend around the body of the regulator.

It will be apparent to the skilled addressee that the term "fluid material" can encompass a number of materials which can flow, such as liquid, atomized liquid droplets in a gas or air, a gaseous material and even a powdered material.

The perforated element may be rotatable about a shaft. The rotation of the perforated elements may be in unison with the propeller or independent of the propeller. The speed of rotation of the propeller and/or perforated element may be determined by the revs per minute (RPM) of the engine and/or load on the engine and/or environmental conditions. Similarly, the temperature of the perforated element and/or propeller may also be determined by the RPM of the engine and/or load of the engine and/or environmental conditions. For example, should the RPM be elevated, the rotation and heating of the propeller and/or perforated elements may be elevated in order to assist vaporization of the fuel and air mixture should the regulator be placed in the inlet manifold. A further example would include use of the heated element for a "cold start" of the engine in order to attain maximum efficiency of the combustion which would reduce the need for a rich mixture of fuel to air ratio when a choke is used for the engine. Preferably, the speed and temperature is controlled by the electronic control unit (ECU) of the engine (although more primitive engines may accommodate the regulator without extensive instrumentation). A thermostatic cut-off can also be implemented with the ECU or independent of the ECU so as to prevent overheating above a certain temperature. Such a control would allow optimisation of conditions for combustion and/ or exit of waste material. The rotation of the propeller and/or perforated elements may be by means of an electrical motor or kinetic energy from the engine. The electrical motor could be powered by either a battery or electric energy produced from the engine via the alternator. With regard to the use of kinetic energy from the engine, this could be by means of a drive shaft or similar connection means to the mechanical power produced from the combustion engine and may be powered from a multi point drive device with a gear and belt. Such a connection means may be via the direct link to the engine drive shaft or could be via a drive belt attached to the drive shaft. It will be evident that the RPM of the engine need not be determined by an ECU and the speed of rotation can be dictated by the drive shaft speed, as would a water pump or an alternator. Alternatively, a gearing system can be employed to increase or decrease the speed of rotation depending on conditions or a specific engine type.

The perforated element may be operable between a first closed position arranged to allow passage of fluid material through the perforations, and a second open position arranged to allow passage of the fluid material by passing the perforations.

The propeller may be produced from a number of materials which would be resistant to degradation or distress by hydrocarbon fuels and or by products thereof. Preferably, the propeller is produced from a heat conductive material such as a metallic substance (e.g. copper). The propeller may be a composite of a heat conductive material and a non-heat conductive material. An example of a composite material would be the use of copper laid or impregnated in a resin material. The propeller may be made out of a heat resistant hydrocarbon material or a plastic/resin material formed in a mould, or made completely from a metallic material. The heat conductive material may additionally be a heating element itself and therefore be capable of conducting electricity in a manner so as to produce heat. The axis of the propeller may be substantially in alignment with the longitudinal axis of the manifold. It will be apparent to one skilled in the art, that manifolds need not necessarily be straight and due to the curvature of certain manifolds, the propeller may be positioned substantially in alignment with respect to the curvature. Alternatively, the axis of the propeller may be angled between 0.6° to 60° with respect of the longitudinal axis of the manifold. Preferably the axis of the propeller is angled between 5 and 50 with respect of the longitudinal axis of the manifold. Whether a propeller is angled in the perforated element may be aligned perpendicular to the longitudinal axis of the manifold. Alternatively, the perforated elements may be disposed at an angle to the manifold wall in the range of 1 to 25°. Preferably, the perforated elements are disposed at an angle to the manifold wall in the range of 5 to 20.

Another advantage of the regulator according to the present invention is that it may serve to reduce, inhibit or prevent the deposition of fuel materials, or contaminants, on the inside surface of the inlet manifold.

In accordance with a further aspect of the present invention, there is provided a regulator for increasing the efficiency of an engine, the regulator being locatable in or adjacent to the engine inlet manifold and comprising at least one perforated element capable of allowing the passage of fluid material therethrough, one or more propellers connected to a power supply for driving the propeller, and means for mounting the at least one perforated element and the propeller in the manifold, the propeller having a longitudinal pin defining a rotation axis and at least one blade attached to the pin by means of an elongated blade root which substantially follows the longitudinal axis of the pin.

The regulator may be located in the inlet manifold of an internal combustion engine. The fluid material may be a fuel and air mixture. Whilst the fuel and air mixture may be mixed and the fuel be atomized by a carburetor feed or by an electronic injector, the mixture may dissipate prior to entering the combustion chamber leaving unused fuel residues in the manifold leading and to inefficient combustion. Therefore, the regulator allows for a more homogenous mixture by ensuring the mixture is continuously moving causing turbulence. Such turbulence also allows the inlet manifold to be cleaned in order to reduce viscosity of the mixture entering the combustion chamber in addition to the propeller increasing downward pressure into the combustion chamber and therefore facilitating a more efficient combustion. Additionally, the downward pressure also assists in removing and re-atomizing unburnt hydrocarbons. The provision of the propeller and/or perforated elements being heated raises the temperature of the mixture in order to assist in more efficient combustion in addition to helping the fuel to vaporize more efficiently prior to entering the combustion chamber. The heating means for the regulator may be dependent or independent of the temperature of the fuel/air mixture passing through the internal combustion engine and such heating may be governed by the use of a ECU. If the regulator is placed in the inlet manifold, the propeller may be located near to or adjacent to the fuel injector or carburetor in order to facilitate greater speed at which the fuel is atomized and/or mixed with the air prior to combustion. The regulator may also be placed in the fuel line or before the fuel distributor pipe. Furthermore, the regulator may replace or form a new type of injector/mixing device for fuel and air in an internal combustion engine (either combined with an existing device or on its own). The regulator may also In order to conserve energy from the power source, the propeller and/or perforated element may rotate only when fuel is injected from an injector or expelled from a carburetor. The regulator may be pre-heated prior to ignition of the engine in order to ensure that the engine runs as efficiently possible irrespective as to whether it is cold or hot. The regulator can act like a turbo charger, but can equally be used in conjunction with a turbo charger or a supercharging device and such use may or may not be in association with the ECU.

The regulator as according to the present invention may be provided with a multiplicity (e.g. 2, 3, 4 or more) propellers in the inlet manifold. These may be mounted side by side, or may be staggered, or may be mounted in series beneath each other. Combinations of these arrangements are also contemplated. In a multi-point engine, one or more propellers may be provided in more than one or, or each of the inlet manifolds and/or cylinder heads.

In accordance with yet another aspect of the present invention, there is provided a regulator for increasing the efficiency of an engine, the regulator being locatable in or adjacent to an engine outlet manifold and comprising at least one perforated element capable of allowing the passage of fluid material therethrough, one or more propellers connected to a power supply for driving the propeller, and means for mounting the at least one perforated element and the propeller in the manifold, the propeller having a longitudinal pin defining a rotation axis and at least one blade attached to the pin by means of an elongated blade root which substantially follows the longitudinal axis of the pin.

The regulator may be located in the outlet (exhaust) manifold of an internal combustion engine in order to ensure efficient removal of exhaust gases from the engine and furthermore can assist in removing certain exhaust emissions. The regulator may further comprise a portion which is charged so as to attract and collect particulate matter from the expelled gaseous/fluid material from the combustion chamber. Such a portion may further comprise a filter in order to collect particulate matter and the filter may be implemented by applying a suction means attached thereto so as to draw particles into the filter. Another portion for liquefying gaseous material may also be provided in order to liquefy certain gaseous material and a suction device may also be applied to this portion in order to attract the gaseous material into that portion. Such gaseous material may comprise $CO_2$, CO, $SO_2$, Hydrocarbons and Nitrogen Oxides.

The regulator described herein can be used on a number of combustion engine types. Preferably, the fuel used in the combustion engine is petrol, diesel, kerosene and liquid petroleum gas and aviation fuel. Preferably, the regulator is used in an engine which powers a means of transportation.

a specific embodiment of the present invention will now be described by way of example only, with reference to the accompanying figures.

Figure 1:
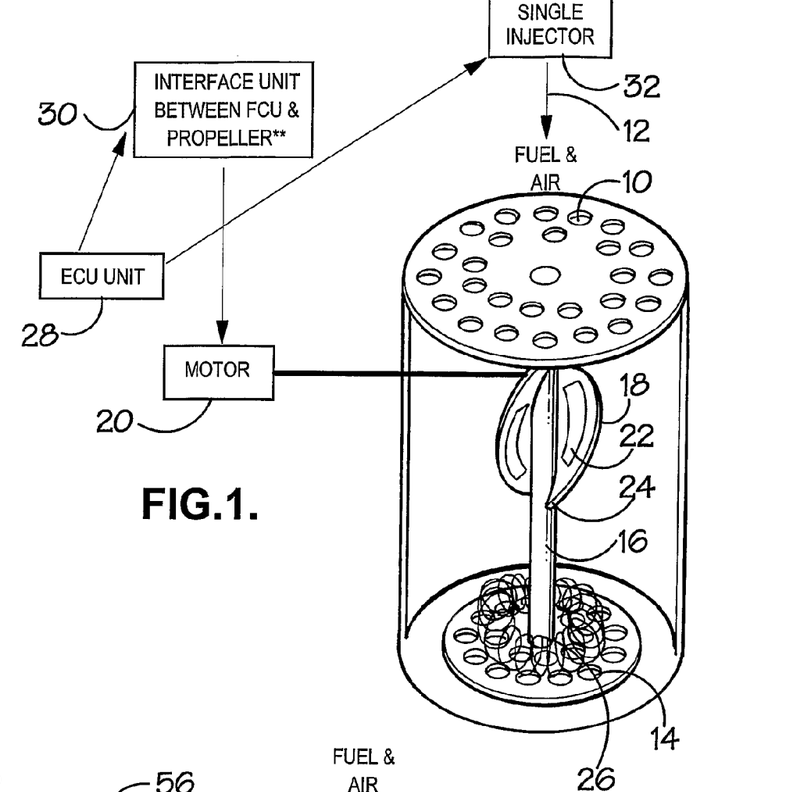
FIG. 1 shows a regulator in accordance with the present invention with one propeller and two perforated elements.

With reference to FIG. 1, there is provided a regulator for placement in an inlet manifold comprising a first perforated element 10 located towards the fuel supply 12 and a second perforated element 14 located,towards the combustion chamber. the regulator also has a shaft 16 to which a propeller 18 is attached and which is capable of rotating via a motor 20. The propeller 18 has two metallic strips 22 located thereon which are capable of either being used as heating elements or capable of heat transduction so as to warm the fuel 12 and air mixture upon entry to the regulator. The propeller 18 is also made from a resin material 24 to which metallic strips 22 are adhered to or impregnated. The second perforated element 14 may be capable of rotation via motor 20 and also comprises a heating coil 26 which can again be used to heat the fuel 12 and air mixture. The rotation of the shaft 16 and heating of the metallic strip 22 and coil 26 is controlled by an electronic control unit 28 which can be configured by an interface unit 30. The ECU unit 28 can also vary the rotation of the shaft 16 in accordance to parameters received sensors (not shown). The fuel and air mixture 12 is supplied to the regulator by means of an injector 32.

Figure 2:
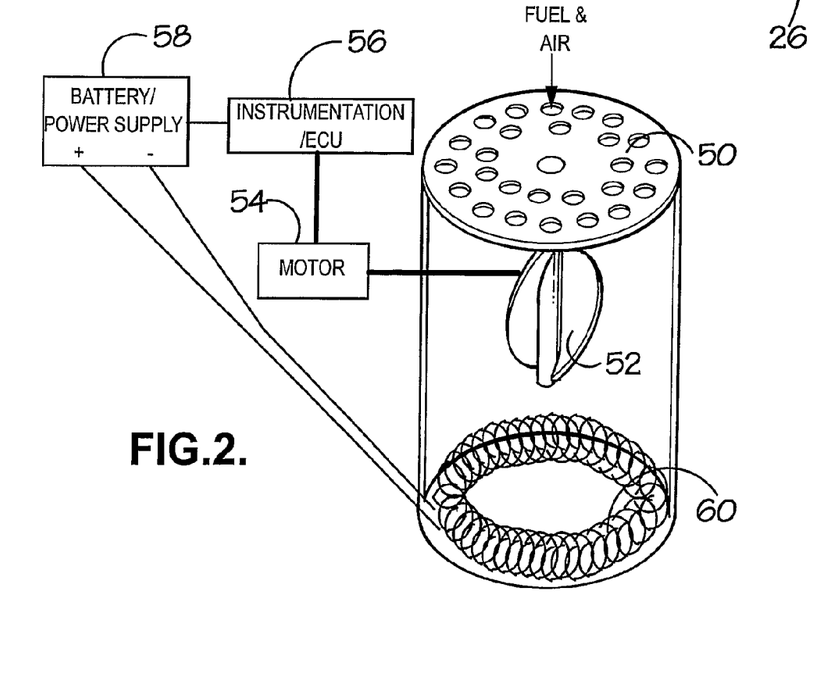
FIG. 2 is a diagram of a regulator in accordance with the present invention comprising a propeller, a perforated element and a heating coil.

With reference to FIG. 2, there is provided a regulator with one perforated element 50 and a propeller 52 made out of an appropriate material. The motor 54 powers the propeller 52 via an instrumentation or electronic control unit 56. Power to rotate the propeller 52 is provided by a battery 58 and a heating coil 60 is also provided in order to warm the fuel and air mixture in order to assist atomization and/or vaporization. The heating coil 60 also being powered by the battery 58.

Figures 3, 4:
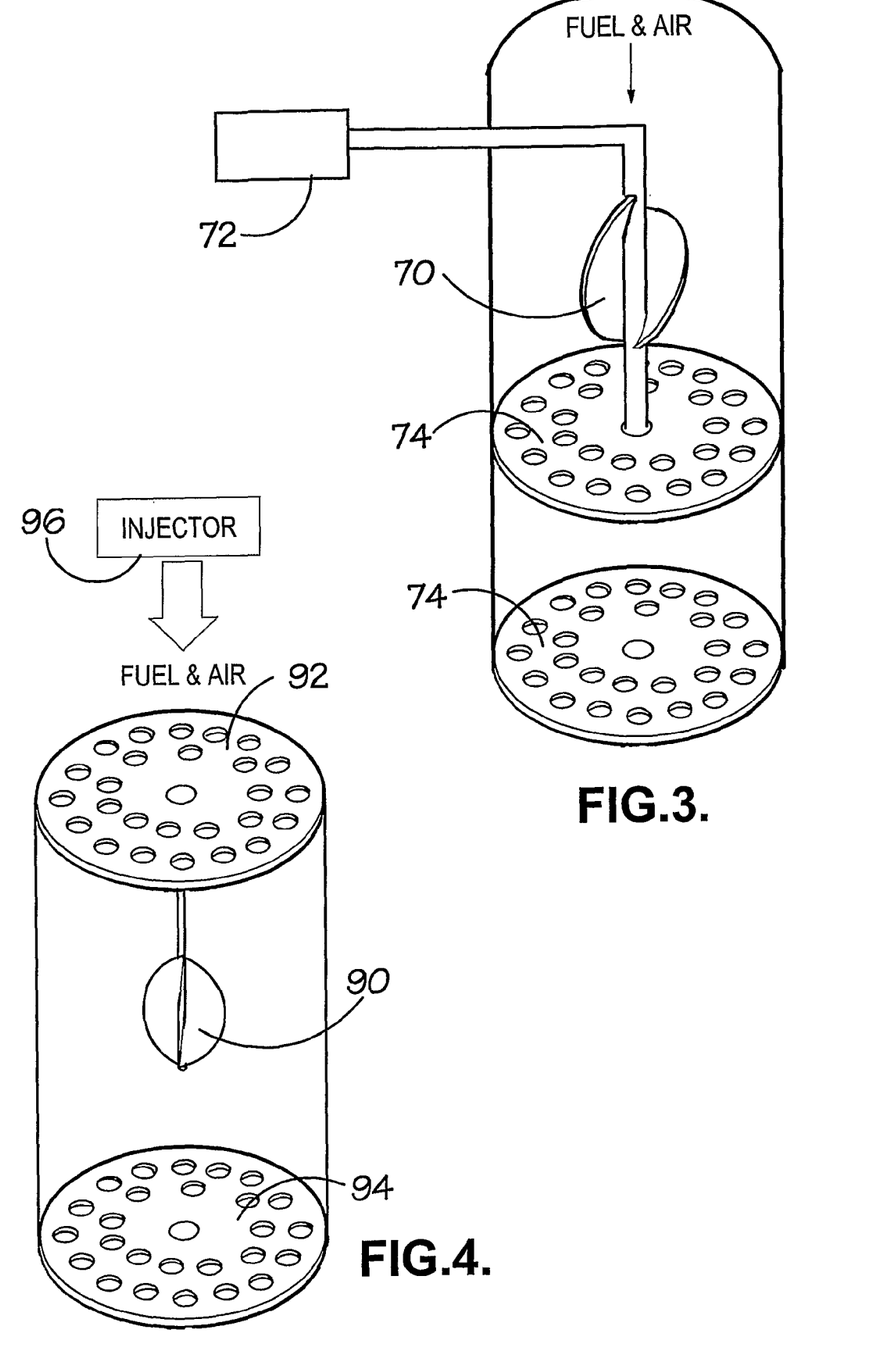
FIG. 3 is a diagram of a regulator in accordance with the present invention having one propeller and two perforated elements.
FIG. 4 is a diagram of a regulator in accordance with the present invention having a propeller and two perforated elements.

With reference to FIG. 3, there is provided a regulator with a propeller 70 powered by a motor 72. Two perforated elements 74 are downstream of the propeller 70.

With reference to FIG. 4, there is provided a regulator with a propeller 90 disposed between a first perforated element 92 and a second perforated element 94. An injector 96 injects the fuel into the manifold and this fuel is atomized with air prior to penetrating the first perforated element 92 and reaching the propeller 90 and then penetrating perforated element 94 prior to reaching the combustion chamber.

Figure 5:
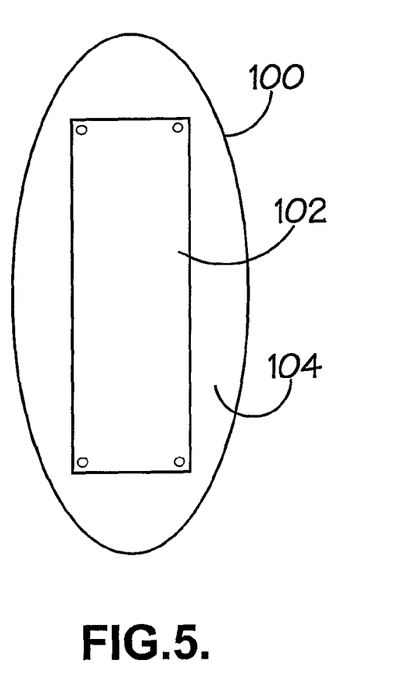
FIG. 5 is a plan view of a propeller as used in a regulator in accordance with the present invention.

With reference to FIG. 5, there is provided a propeller blade 100 which comprises a heat/electric current conducting strip 102 which is either boded onto a resin blade 104 or impregnated therein. The metallic strip 102 may act as a heating means by transferring heat from other parts of the regulator to the fuel and air mixture or alternatively may be used as a heating element itself by connecting it to a power source such as a battery supply.

Figure 6:
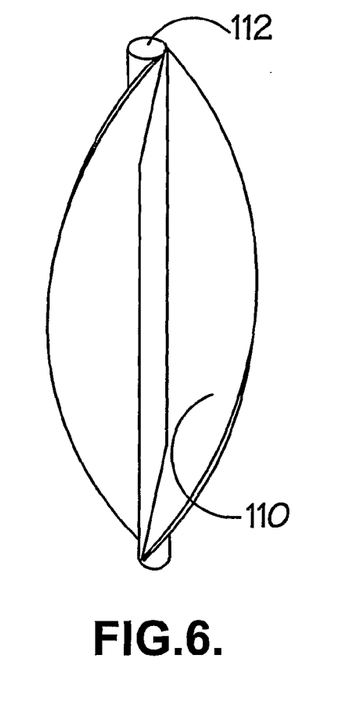
FIG. 6 is an embodiment of a propeller as used in a regulator in accordance with the present invention.

With reference to FIG. 6 there is provided a propeller blade 110 of a elliptical shape produced wholly from a heat transducing material or a resin material capable of withstanding exposure to hydrocarbon fuels. The blade has a spindle 112 through which a shaft can be placed and the propeller rotated.

Figure 7:
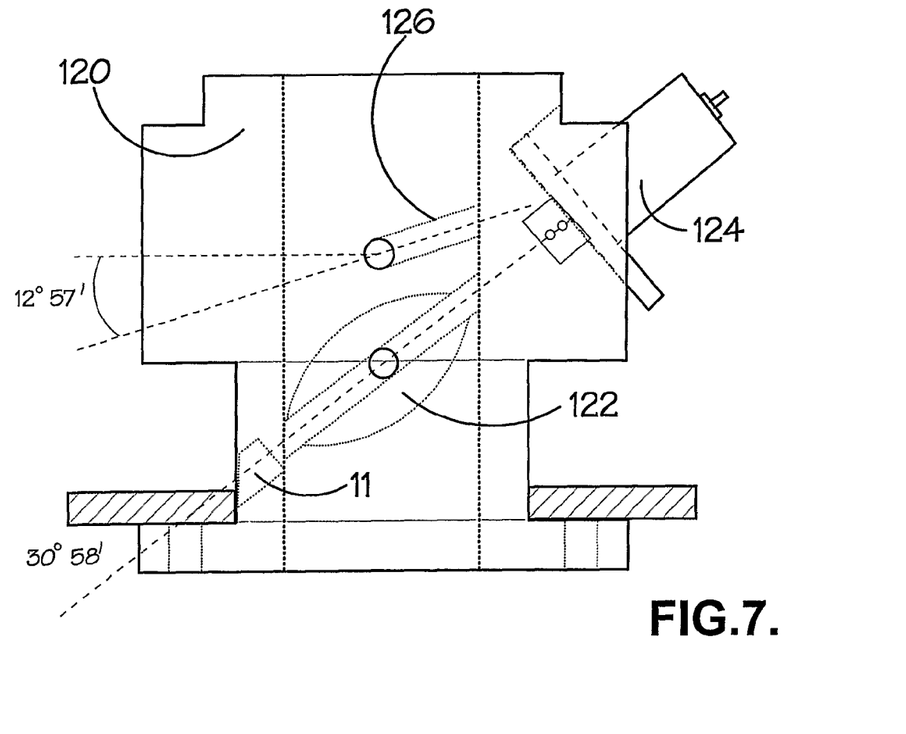
FIG. 7 shows a schematic diagram of a propeller and perforated element forming a regulator located in an inlet manifold in accordance with the present invention.

With reference to FIG. 7, there is provided a regulator placed inside an inlet manifold 120 whereby the propeller 122 is positioned at an angle of approximately 30° in the manifold block and has a motor 124 which powers the propeller 122 where appropriate. A perforated element 126 is disposed at an angle of 12° in the manifold tube at the air/fuel inlet end of the manifold.

Figure 8:
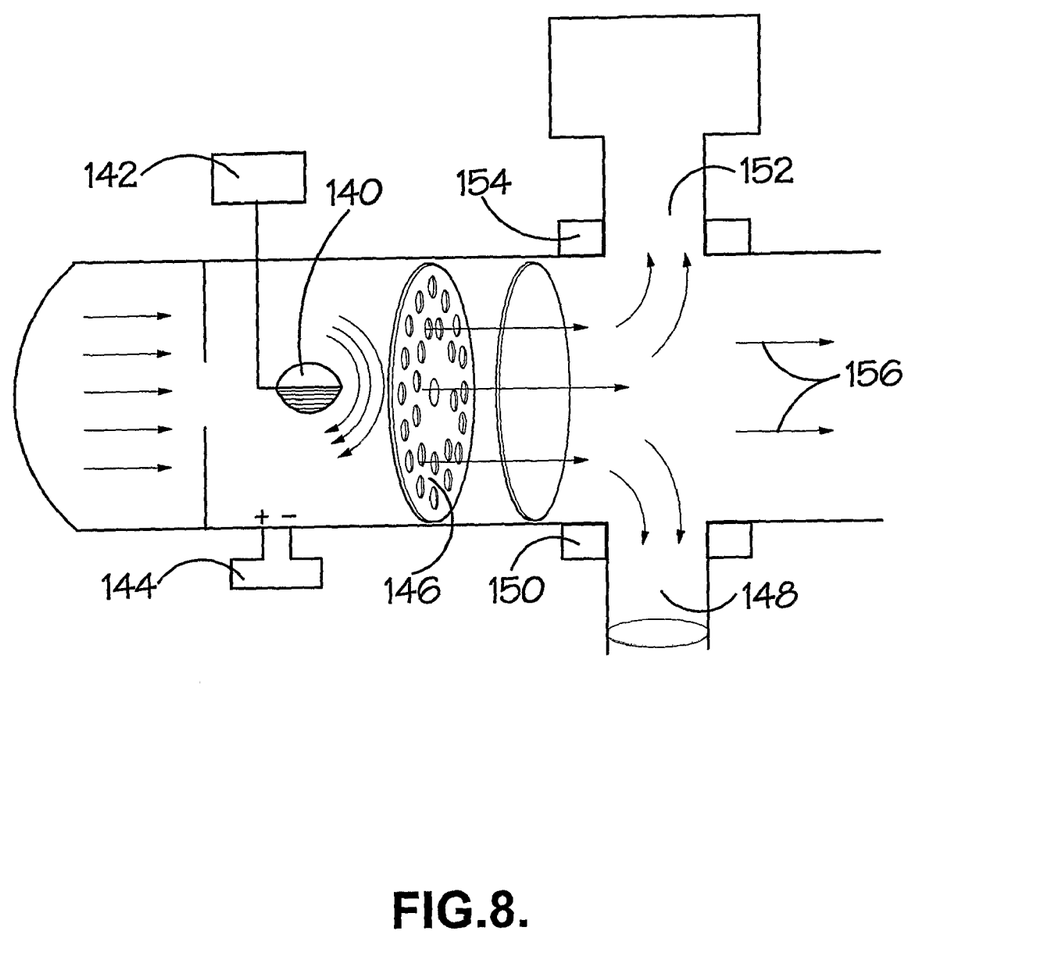
FIG. 8 is a diagram of a regulator in accordance with the present invention used in an outlet manifold.

With reference to FIG. 8, there is provided a regulator for use in an outlet manifold comprising a propeller 140 which is rotatable via a motor 142, A portion of the regulator has a charging unit 144 capable of charging the emitted gas from the exhaust in order to attract heavy particles. The charging device also has a collection part which is capable of storing particles of which have been attracted by the charging unit 144. A perforated element 146 is also provided which is heated and thus can burn excess gases if required. The exhaust gases can then pass to a filter 148 which has a suction pump 150 attached in order to filter particulate matter from the exhaust gases. The particulate or heavy matter can either be held in a holding device such as a bag 158, or recycled upstream of the regulator by means of recycling tube 160 which deposits material. It will be most usual for particulate material to be held in the bag 158, whilst the recycling tube 160 will recycle fluid material such as unburnt fuel and exhaust gases. Furthermore, liquefying device 152 is also provided again with a suction pump 154 for liquefying certain gases should it be required in order to reduce the emissions of the exhaust. The resultant gases 156 can then either continue into a catalytic converter or out into the environment. The device attached to the outlet manifold can be placed either before or after the catalytic converter should one be fitted to the engine.

Figure 9:
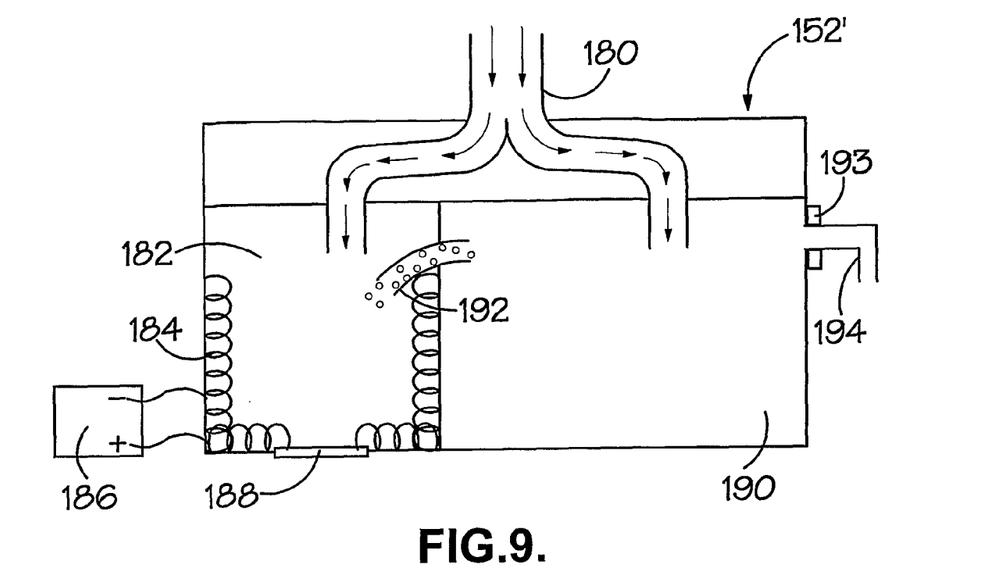
FIG. 9 is a diagram of the liquefying device of a regulator as shown in FIG. 8.

In FIG. 9, there is provided a liquefying device 152' as shown in FIG. 8 which has an entry tube 180 which branches into two chambers, the first chamber 182 contains a freezing medium such as liquid nitrogen which is cooled by cooling coils 184 powered by a battery 186. Frozen material (including the freezing medium) can be removed by means of a door 188 which can be activated remotely. The second chamber 190 contains water or a similar liquid which is capable of dissolving gases. An overflow tube 192 is also provided that allows excess gases from the first chamber 182 to enter the second chamber 190 when no more material can be held in the first chamber 182. A sensor 193 allows for a tap 194 to be opened in order to allow material to be removed from the second chamber 190. The removal of material from both the first and second chambers 182, 190 can be into a hole in the ground, at a fuel station or deposited onto the ground.

Figure 10:
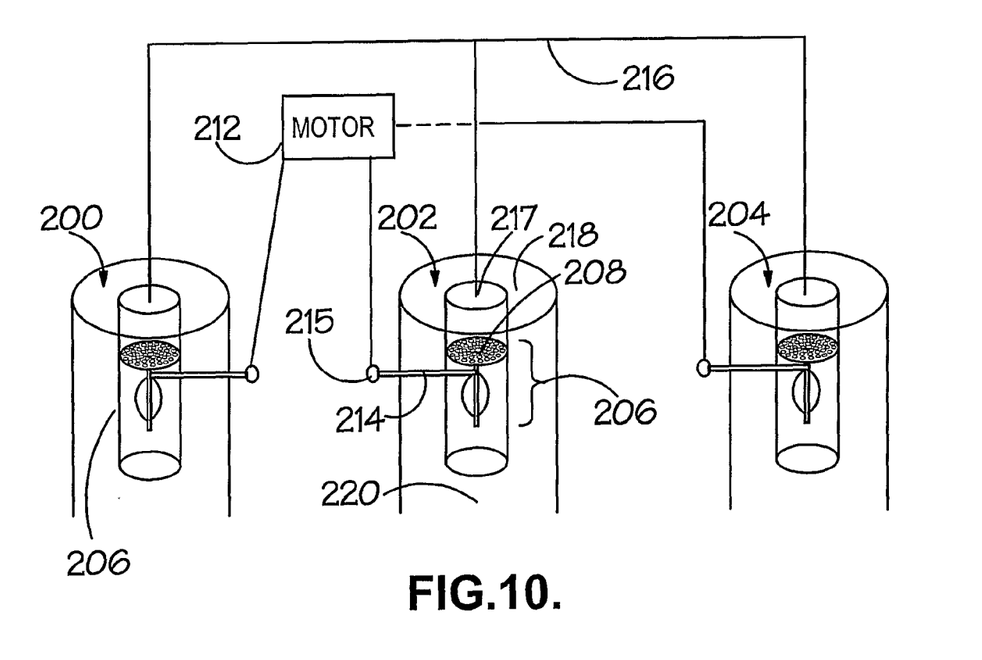
FIG. 10 is a diagram of multiple regulators in accordance with the present invention used in an inlet manifold.

With reference to FIG. 10, there is provided 3 manifolds 200,202,204 each of which houses a regulator 206. Each regulator has a perforated element 208 and a propeller 210. The rotation of the propeller 210 and optionally, the perforated element 208 is by means of a motor 212 that powers a drive shaft 214 which is connected to a gearing or belt mechanism 215. All of the drive shafts may be powered by a single shaft (not shown) connected to the motor, which then powers individual shafts connected to each regulator 206. A fuel rail 216 supplies fuel to the regulators 206 by means of injectors 217. Each manifold 200,202,204 terminates in a combustion chamber (not shown) in an engine 220, which in turn has an outlet manifold (also not shown) into which exhaust gases from the chamber are emitted. The motor 212 can be a number of individual motors. The motor(s) can be linked to the ECU, as can the fuel rail so that rotation of the propeller 210 and optionally the perforated element 208 so that their actions can be coordinated.

Figure 11:
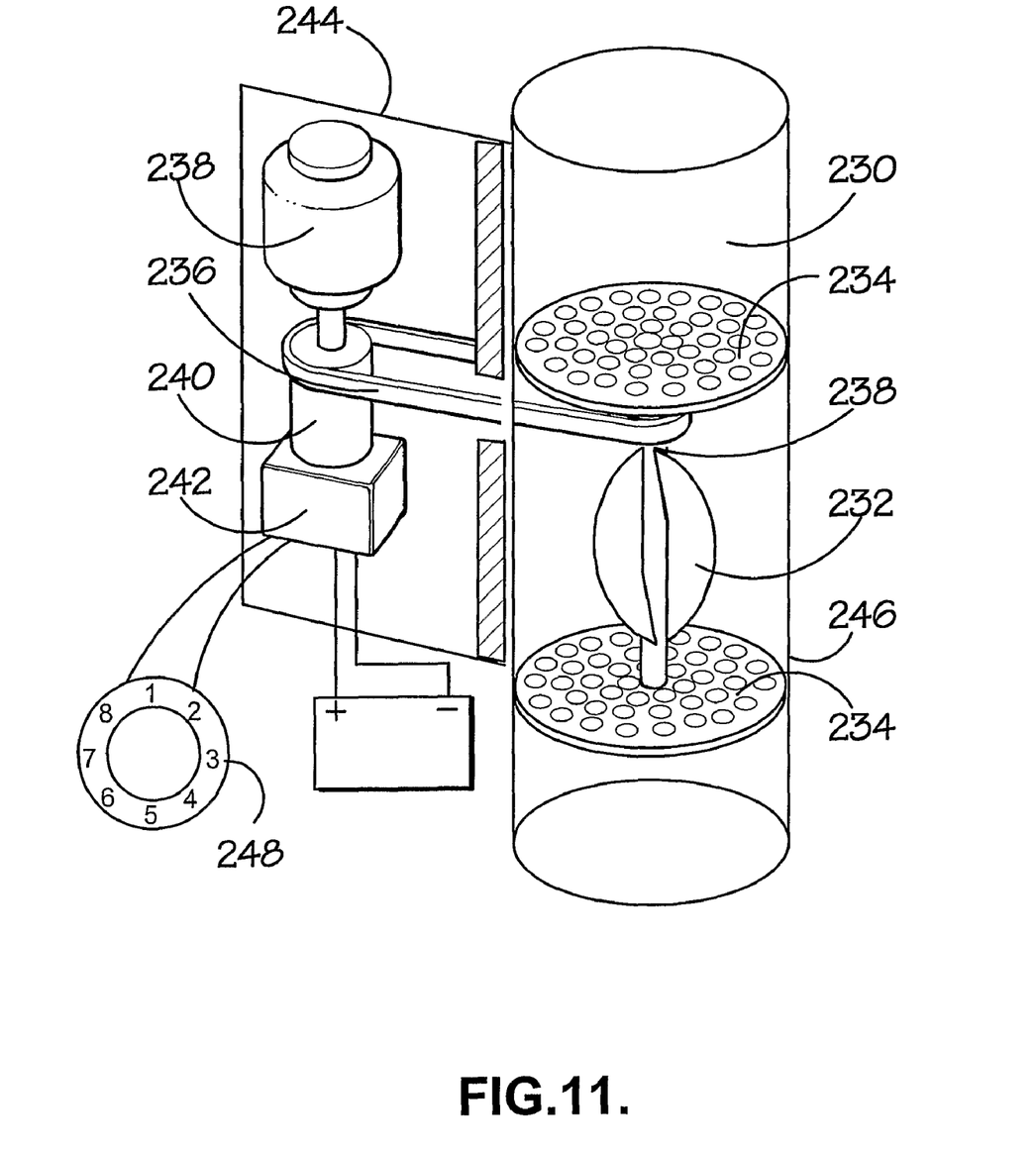
FIG. 11 is a diagram of a regulator in accordance with the present invention which is powered by a belt and a motor.

With reference to FIG. 11, there is provided a manifold 230 housing a regulator with a propeller 232 and two perforated elements 234. A belt 236 drives the shaft 238 in order that the propeller 234 and optionally, the perforated elements 232 can rotate. The belt is driven by a motor 238 which powers a drive shaft 240 and the motor is powered by a battery 242. The motor is in its own housing 244 which is separate from the regulator housing 246. A control device 248 varies the speed of the motor depending upon a number of variables.

When the regulator is used in conjunction with an inlet manifold, it will be most commonly controlled by an electronic control unit 28 which can be programmed by a interface unit 30 which ultimately controls the motor 20, 54 and 72. Therefore the rotation of the propeller 18, 52, 70, 90, 100, 110, 122, 210, 232 will be dictated by engine speed and engine load and a number of other variables. The ECU 28 will also determine the correct rotation after assessing information and in conjunction with use of an injector 32, 96, 217 or carburetor if one is fitted. A number of differently shaped propellers 18, 52, 70, 90, 100, 110, 122 can be used and most commonly it will be in the form of an elliptical shape, a teardrop shape, a bell shape, triangular, rectangular or variations thereof. The propeller 18, 100, can be used as a heating element in order to heat the fuel and air when in the regulator and this can be via metallic strips 22, 102 which act as heating elements or act to dissipate the heat throughout the regulator. The ECU unit 28, 56 also controls the speed by which a perforated disc 10, 14, 50, 74, 92, 94, 126, 208, 234 can rotate if it rotates and it can also control the heating of the element as such an element may in itself be used as a heating element for having heating element embedded therein. Alternatively, a separate heating element 26 or 60 can be placed in the regulator and this may or may not be connected near to a perforated element as show in FIG. 1. The propeller 18, 52, 70, 90, 100, 102, 110, 122, 210 and 232 can be angled depending on the size and the curvature of the manifold and indeed can be angled relative to the axis of the manifold tube depending on the application and optimization of vaporization/atomization. The propeller can be placed in any position in the manifold such that it is located in between the two perforated elements, before its perforated elements, after a perforated element and indeed next to or adjacent to an injector or carburetor.

The action of the rotating propeller and/or perforated element which can be heated if required allows for a homogenous mixture of air and fuel and reduces the emissions from the engine whilst improving fuel consumption. Therefore, the combination of the propeller and the perforated element greatly improves efficiency. Any crevice in the inlet manifold which stores unburnt hydrocarbons can be removed by air pressure as the propeller creates a pressure on the combustion chamber and when the combustion chamber is closed for firing, pressure builds up in the inlet manifold which helps to remove unburned hydrocarbons and thus cleaning the inlet manifold. The propeller also helps to increase the firing of the cylinders as turbulence is increased in the air and fuel mixture prior to entering the combustion chamber. The provision of heating the perforated element assists in mixing of the fuel and air mixture and the elevated temperatures also assist in the engine starting from cold and reducing the richness of the mixture when the engine is subject to a choke. The regulator may be fitted to a fuel line or fitted before the fuel distributor. The propeller need not be used continuously and can be turned on and off according to each injector or carburettor stream being active at any given time, and this will greatly reduce the energy consumption of the regulator and therefore be less of a load on the battery and/or engine resulting in improved efficiency.

The propeller may be of a number of configurations but will commonly comprise 3 to 10 blades. The perforated element can be a mesh or similar device and the material used and indeed the size of the mesh will be dictated by a number of variables such as manifold size and flow rates etc.

The regulator can also be used in the outlet manifold and will operate in a similar manner if it were in the inlet manifold. The main principles regarding the propeller 140 and the motor 142 being controlled by an electronic control unit remains the same as does the perforated filter 146 being capable of adjustment to be at an angle or indeed rotated in unison or separately from the propeller 140. Additionally, there is provided a charging device 144 which is electrically charged with two electrodes which when activated can attract large particles from the exhaust gas emissions and stored for future disposal or removal. The use of a charging device will be particularly useful in the field of diesel vehicles whereby heavy diesel particles are often limited via the exhaust. Indeed, it is these particles which have been attributed to a number of diseases in recent years. Furthermore, a particulate bag 148 can also be used in conjunction with a suction pump 150 in order to remove further particulate matter via employing a similar vice to that of a vacuum cleaner wherein a suction is made to an area (part of the exhaust manifold) which can store and attract particulate matter which is not being collected by the charging device. Additionally, a liquefying device 152 again has a suction pump 154 which is also employed and this device is used in order to liquefy gas and freeze certain gaseous compounds which may be potentially dangerous to the environment. The exact means by which the device liquefies gas may be by means of liquid nitrogen or a similar cooling agent.

The regulator for use in either the inlet or the outlet manifold can be installed as an integral part of the manufacture of the manifolds or indeed the engine. However, they may also retro-fitted to existing engines. In either case, the regulators can be manufactured as single sealed units to facilitate easy installation.

The invention claimed is:

1. A regulator for increasing the efficiency of an engine, the regulator being locatable in or adjacent to an engine manifold and comprising a propeller connected to a power supply for driving the propeller, and a means for mounting the propeller in or adjacent to the manifold, such that the axis of the propeller is between 0.6° and 60° with respect to the longitudinal axis of the manifold, the propeller having a longitudinal pin defining a rotation axis and at least one blade attached to the pin by means of an elongated blade root which substantially follows the longitudinal axis of the pin.

2. A regulator according to claim 1, wherein the blade root follows the longitudinal axis of the pin in an at least partial helical manner.

3. A regulator according to claim 1, wherein the blade root has a length measured along the pin that is greater than a distance measured transverse to the longitudinal axis of the pin to a tip of the blade remote from the pin.

4. A regulator according to claim 1, comprising at least one perforated element capable of allowing the passage of fluid material therethrough, and a means for mounting the perforated element in the manifold.

5. A regulator according to claim 4, wherein the propeller is mounted beneath the perforated element.

6. A regulator according to claim 1, wherein the blade has a substantially smoothly curving blade edge.

7. A regulator according to claim 1, wherein the blade has a shape substantially of an ellipse, a part ellipse, a teardrop, a half-teardrop, a bell curve, or a half-bell curve.

8. A regulator according to claim 1, wherein the blade is relatively wider towards one end of the blade root.

9. A regulator according to claim 1, wherein the propeller is effective to pull fluid material from a region upstream of the propeller to a region downstream of the propeller and cause turbulent flow in the region downstream thereof.

10. A regulator according to claim 1, wherein the propeller is mounted such that the axis of the propeller is between 0.6° to 60° with respect of the longitudinal axis of the manifold.

11. A regulator for increasing the efficiency of an engine, the regulator being locatable in or adjacent to an engine manifold and comprising at least one perforated element cable of allowing a passage of fluid material therethrough, means for mounting the perforated element in the manifold, a propeller connected to a power supply for driving the propeller, and means for mounting the propeller in the manifold beneath the perforated element, the propeller having a longitudinal pin defining a rotational axis and at least one blade attached to the pin by an elongated blade root which substantially follows the longitudinal axis of the pin in at least partial helical manner, the blade of the propeller being relatively wider towards one end of the blade root, the length of the blade root measured along the pin being greater than a distance measured transverse to the axis of the pin and extending between the pin and a tip of the blade.

12. A regulator according to claim 11, wherein the blade has a substantially smoothly curving blade edge.

13. A regulator according to claim 12, wherein the propeller is mounted so that the axis of the propeller is between 0.6° to 60° with respect to a longitudinal axis of the manifold.

* * * * *